United States Patent [19]

Ishibashi et al.

[11] Patent Number: 5,302,243

[45] Date of Patent: Apr. 12, 1994

[54] DEINKING METHOD

[75] Inventors: Yoichi Ishibashi; Yoshinao Kono; Yoshitaka Miyauchi; Takanobu Shiroishi; Hiromichi Takahashi, all of Wakayama, Japan

[73] Assignee: Kao Corporation, Tokyo, Japan

[21] Appl. No.: 880,087

[22] Filed: May 5, 1992

[30] Foreign Application Priority Data

May 31, 1991 [JP] Japan .................. 3-129508

[51] Int. Cl.$^5$ .............................. D21C 5/02
[52] U.S. Cl. ....................................... 162/5
[58] Field of Search ........... 162/5; 252/174.21, 174.22

[56] References Cited

U.S. PATENT DOCUMENTS

| 4,964,949 | 10/1990 | Hamaguchi et al. | 162/5 |
| 5,100,574 | 3/1992 | Urushibata et al. | 162/5 |
| 5,120,397 | 6/1992 | Urushibata et al. | 162/5 |

FOREIGN PATENT DOCUMENTS 434084 6/1991 European Pat. Off. ............. 162/5

Primary Examiner—Karen M. Hastings
Attorney, Agent, or Firm—Birch, Stewart, Kolasch & Birch

[57] ABSTRACT

The present invention aims at developing a deinking method applicable to the deinking of, for example, waste OA (office automation) paper and telephone directories, whereby a deinked pulp having a high whiteness and little contamination with large ink spots and unliberated ink can be obtained. The object of the present invention can be achieved by deinking, for example, waste OA paper or telephone directories by using a deinking composition containing as an effective component a reaction mixture (III) obtained by conducting the addition reaction of ethylene oxide and propylene oxide with a mixture (I) comprising a fat and oil (a) and a mono- to hexahydric alcohol (b) and/or with a transesterification mixture (II) obtained by conducting the transesterification reaction of a fat and oil (a) with a mono- to hexahydric alcohol (b), in such a manner that the molar ratio of ethylene oxide to propylene oxide which are used as starting materials ranges from 0.8 to 1.2 and that the molar number of ethylene oxide which is used for the addition reaction ranges from 50 to 100 mol per mole of the fat and oil (a).

15 Claims, No Drawings

DEINKING METHOD

BACKGROUND OF THE INVENTION

1. Field of the Invention

The present invention relates to a method to be used for the reclamation of waste papers. More particularly, it relates to a deinking method whereby a deinked pulp having a high whiteness and having little contamination by unliberated large ink spots having a particle size of 30 μm or more and undisintegrated matter can be obtained by the deinking of, for example, magazines, waste OA paper, which is office automation waste paper, such as plain paper copies and ledgers, or telephone directories by flotation, washing or a combination procedure thereof.

2. Description of the Related Art

It has been a practice to reclaim waste papers including newspapers and magazines. Recently the effective utilization of waste paper has become more and more important in conjunction with the problems of the shortage of pulp resources and the rise in the prices thereof. Further, attempts have been made to expand the use of deinked pulp obtained from waste paper and to utilize it as a pulp of a higher rank.

On the other hand, recent improvements in printing techniques, printing systems and printing ink compositions have made it difficult to deink waste paper. Furthermore, the use of types of waste paper which have not been reclaimed heretofore have also made it difficult to deink waste paper. In order to facilitate deinking, therefore, attempts have been made to improve deinking devices and, furthermore, studies on deinking agents have been performed.

In order to remove inks and other impurities from waste paper, deinking compositions which comprise alkaline agents such as sodium hydroxide, sodium carbonate and sodium phosphate, bleaching agents such as hydrogen peroxide, hydrosulfites and hypochlorites, sequestering agents such as EDTA and DTPA, and deinking agents, either alone or in the form of a mixture thereof, including anionic surfactants such as alkylbenzenesulfonates, higher alcohol sulfates, α-olefinsulfonates and dialkyl sulfosuccinates, and nonionic surfactants such as ethylene oxide adducts of higher alcohols, alkylphenols and fatty acids, and alkanolamides, have been used. Although these deinking compositions have excellent foaming properties in the flotation method, their abilities to collect ink are limited. In the washing method, on the other hand, they are poor in detergency and, furthermore, the good foaming properties thereof cause problems in the effluent disposal step. As a result, only a deinked pulp of a low grade can be obtained by these methods.

When waste OA papers including plain paper copy (PPC) and computer print output (CPO) are to be deinked, in particular, a number of large ink spots having a particle size of 30 μm or more remain unliberated after completing a common deinking treatment with the use of the above-mentioned conventional deinking compositions. A reason for this is that the printing inks (toners) used therein comprise styrene/acrylic binders or polyester binders, differing from the conventional ones used for printing newspapers. In waste papers containing a large amount of a strength additive for maintaining the strength under wet conditions (for example, telephone directories), on the other hand, a large amount of undisintegrated matter remains after the completion of a common deinking treatment with the use of the above-mentioned conventional deinking compositions.

It is therefore necessary to apply a large shear force energy or to use a large amount of alkali in order to deink these waste OA papers, magazines or telephone directories. However the use of a large amount of alkali suffers from some disadvantages including an increase in sticky matter, an increased load in the effluent disposal step, and increased brittleness of the pulp. Thus no method for effectively deinking waste OA paper, magazines, telephone directories and blends containing them has been established thus far.

The present inventors previously proposed the use of a reaction product obtained by the addition reaction of an alkylene oxide with a mixture of a natural fat and oil and a monohydric or polyhydric alcohol as a deinking agent (refer to Japanese Patent Laid-Open No. 139486/1990, No. 293483/1990, No. 293484/1990, No. 293485/1990, No. 881/1991 and European Patent Laid-Open No. 039667 and No. 0241224). Subsequently, the present inventors have examined in detail the behavior of these deinking agents in the deinking step. As a result, they have found out that deinked pulp obtained by treating waste OA paper, magazines, telephone directories or waste paper blends containing newspaper and waste OA paper, magazines or telephone directories with deinking compounds in which the alkylene oxide is a mixture of ethylene oxide and propylene oxide and the addition ratio of ethylene oxide to propylene oxide ranges from 1.8 to 2.2 is contaminated with a number of unliberated large ink spots having a particle size of 30 μm or more or a large amount of undisintegrated matter, though these compounds exert excellent deinking effects on waste newspapers.

DISCLOSURE OF THE INVENTION

Summary of the Invention

The present inventors have conducted extensive studies in order to develop a deinking composition and a deinking method showing a good deinking performance (a high b value) without causing any foaming problems whereby a deinked pulp of a high whiteness can be obtained from various waste papers, in particular, large ink spots having a particle size of 30 μm or more and undisintegrated matter can be removed from waste OA paper, magazines, telephone directories and blends containing them, without requiring any large shearing force energy in the flotation, washing or combination procedure thereof. As a result of this extensive study, they have completed the present invention.

Accordingly, the present invention provides a method for deinking waste paper which comprises treating a waste paper pulp with a deinking composition comprising or consisting essentially of, as an effective component, a reaction mixture (III) obtained by conducting the addition reaction of ethylene oxide and propylene oxide with a mixture (I) comprising or consisting essentially of a fat and oil (a) and a mono- to hexahydric alcohol (b) or with a transesterification mixture (II) obtained by conducting the transesterification reaction of a fat and oil (a) with a mono- to hexahydric alcohol (b), or with both, in such a manner that the molar ratio of ethylene oxide to propylene oxide which are used as starting materials ranges from 0.8 to 1.2 and that the molar number of ethylene oxide which is used for the addition reaction ranges from 50 to 100 mol per mole of the fat and oil (a).

In order to prepare the mixture (I) and/or the transesterification mixture (II), a fat and oil (a) and a mono- to hexahydric alcohol (b) may be used at a molar ratio of (b) to (a) of preferably from 0.05 to 1, still more preferably from 0.1 to 0.5.

It is recommended to use glycerol as the mono- to hexahydric alcohol (b).

It is recommended that the addition reaction of ethylene oxide and propylene oxide is a random addition.

The deinking composition may be added either all at once in a waste paper pulping step or in portions in a waste paper pulping step and in any of the subsequent steps which may comprise the mixing step.

Namely, the present invention is a method for deinking waste paper, comprising or consisting essentially of;
(I) pulping the waste paper,
(II) subjecting the pulp to at least one treatment step selected from the group consisting of kneading, dispersing, chemical mixing and refining, and
(III) subjecting the treated pulp to a flotation or washing step,
wherein the deinking composition described above can be added all at any time during steps (I), (II) and
(III), preferably either all at once in step (I), or in portions in steps (I) and (II).

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The fat and oil (a) in the present invention means a fat(s) and/or an oil(s). Examples of the fat and oil (a) to be used in the present invention include vegetable oils such as coconut oil, palm oil, olive oil, soybean oil, rapeseed oil, linseed oil, castor oil and sunflower oil, land animal fats such as lard, beef tallow and bone fat, marine animal fats such as sardine oil and herring oil, fats and oils obtained by the hardening or semi-hardening of the above fats and oils, and fats and oils recovered during the refining thereof. That is to say, fats and oils comprising triglycerides as the major component are usable herein.

Examples of the mono- to hexahydric alcohols to be used in the present invention are as follows.

As the monohydric alcohol usable in the present invention, 1-alkanols or alcohols-1, 2-alkanols or alcohols-2, unsaturated alcohols and cyclic alcohols each having 1 to 24 carbon atoms may be cited. Specific examples thereof include aliphatic higher alcohols such as octanol, nonanol, decanol, undecanol, lauryl alcohol, myristyl alcohol, cetyl alcohol, stearyl alcohol, eicosanol, oleyl alcohol, elaidyl alcohol and linoleyl alcohol and synthetic alcohols such as methanol, ethanol, n-propyl alcohol, isopropyl alcohol, 2-ethylhexanol, 2-hexanol, cyclononanol and cyclodecanol.

As the dihydric alcohol usable in the present invention, α, ω-glycols, 1,2-diols, symmetric α-glycol and cyclic 1,2-diols each having 2 to 32 carbon atoms may be cited. Specific examples thereof include hexane-1,2-diol, octadecane-1,2-diol, eicosane-1,2-diol, ethylene glycol, propylene glycol, butanediol, hexanediol, cyclononane-1,2-diol, butanoyl-α-glycol and hexanoyl-α-glycol.

As the tri- to hexahydric alcohols, those having 3 to 24 carbon atoms are preferable. Specific examples thereof include glycerol, erythrose, erythrulose, erythritol, threose, pentaerythritol, diglycerol, arabinose, xylose, xylulose, deoxyribose, lyxose, ribulose, ribose, arabitol, ribitol, altrose, allose, galactose, gulose, mannose, glycitol, inositol, mannitol, sorbitol and tetraglycerol.

The mixture (I) to be used in the present invention comprises or consists essentially a fat and oil (a) and a mono- to hexahydric alcohol (b). The molar ratio of (b) to (a) may preferably range from 0.05 to 1, still more preferably from 0.1 to 0.5.

The transesterification mixture (II) to be used in the present invention may be obtained by subjecting a fat and oil (a) and a mono- to hexahydric alcohol (b) to transesterification in the conventional manner. In this reaction, the reactants may be preferably used at a molar ratio of (b) to (a) of from 0.05 to 1, still mmore preferably from 0.1 to 0.5.

In order to obtain a deinked pulp having a particularly high whiteness, it is recommended to use a deinking composition containing, as a deinking agent, a reaction mixture (III) which is obtained by using a transesterification mixture (II) prepared by reacting a fat and oil (a) with from 0.1 to 0.5 mol, based on mole of the fat and oil (a), of glycerol as the mono- to hexahydric alcohol (b).

The transesterification may be effected, for example, at a temperature of 135° C. under a pressure of 30 Torr (0.04 atm).

The alkylene oxide which adds to the mixture (I) and/or the transesterification mixture (II) to give the reaction mixture (III) is a mixture of ethylene oxide (hereinafter referred to simply as EO) with propylene oxide (hereinafter referred to simply as PO). Although the addition reaction of the alkylene oxide may be conducted by either random addition or block addition, random addition is preferable when taking into consideration foaming problems in the papermaking and effluent disposal steps.

The addition molar ratio of EO and PO, that is, the entire EO in the reaction mixture to the entire PO in the reaction mixture, is 0.8 to 1.2. The average EO addition mole number ranges from 50 to 100 per mole of the fat and oil (a) in the mixture (I) and/or the fat and oil (a) employed for preparing the transesterification mixture (II). Namely, EO and PO, as starting materials, are used at a molar ratio of EO to PO being 0.8 to 1.2, and EO is used 50 to 100 times by mole as much as the fat and oil (a).

As will be apparent from the Examples and Comparative Examples to be given hereinafter, when a deinking composition comprising, as an effective component, a deinking agent in which the molar ratio of EO to PO exceeds 1.2, is used, newspaper can be effectively deinked but a deinked pulp obtained by deinking waste OA paper, magazines, telephone directories or blends containing them is seriously contaminated with unliberated large ink spots and undisintegrated matter and, therefore, a deinked pulp having a good appearance cannot be obtained thereby. When a deinking composition comprising, as an effective component, a deinking agent in which the molar ratio of EO to PO is less than 0.8, is used, on the other hand, the obtained deinked pulp contains a large amount of unliberated ink. Thus, a deinking composition comprising an effective component in which the addition molar ratio of EO to PO is outside the range specified above has only a limited ability to liberate ink from waste OA paper, magazines or telephone directories. In the case of the flotation method, furthermore, a number of large ink spots having a particle size of 30 μm or more remain unliberated in the deinked pulp. On the other hand, a deinking composition comprising an effective component in which the addition molar ratio of EO to PO falls within the range specified above is also effective in reducing undisintegrated matter. Thus, in the deinking of waste OA paper, magazines, telephone directories or blends containing them, a deinked pulp having a high whiteness and being little contaminated with unliberated large ink spots and undisintegrated matter cannot be obtained unless a deinking composition comprising a reaction mixture (III) of a molar EO to PO ratio of from 0.8 to 1.2 is used.

When a deinking composition comprising a deinking agent as an effective component, having the molar number of EO addition per mole of the fat and oil (a) in the mixture (I) and/or the fat and oil (a) employed for preparing transesterification mixture (II) outside the range of from 50 to 100 mol is used, the deinked pulp obtained is contaminated with a large amount of unliberated ink. Thus it is difficult in this case to obtain a deinked pulp having a high b value and a good appearance. In particular, when a deinking composition comprising a deinking agent, as an effective component, wherein an average molar number of EO addition exceeding 100 mol is used, the disadvantage that the ink is dispersed is added.

Accordingly, the numerical values relating to the reaction mixture (III) specified with respect to the present invention are critical. Thus any composition or substance similar to the reaction mixture (III) cannot exert the remarkable effects of the present invention in the deinking of waste OA paper, magazines, telephone directories or blends containing them, unless it satisfies these numerical value relationships.

In the present invention, the addition reaction of EO and PO may be effected by any common method without restriction. Namely, it may be carried out under the conditions commonly employed in the addition reaction of an alkylene oxide with a compound having active hydrogen. Specifically, it may be performed as follows. A catalytic amount of an alkaline substance is added to the mixture (I) and/or the transesterification mixture (II). Then the obtained mixture is reacted with EO and PO at a temperature of from approximately 100° to 200° C. under a pressure of from 1 to 3 kg/cm² (gauge) for several hours. Thus the EO and PO can add to the alcoholic hydroxyl groups in the compounds of the mixture (I) and/or the transesterification mixture (II) or the alcoholic hydroxyl groups of compounds derived from compounds in the mixture (I) and/or the transesterification mixture (II), during the addition reaction of EO and PO.

The deinking composition to be used in the present invention is not particularly restricted, so long as it contains the above-mentioned reaction mixture (III) as an effective component. It may contain also an effective component(s) of known deinking compositions, for example, higher alcohol sulfates or half esters of higher alcohols with sulfuric acid (ROSO$_3$M), alkylbenzenesulfonates, ethylene oxide adducts of higher alcohols and alkylphenols, fatty acids and salts thereof, alkylene oxide adducts of fatty acids, alkylene oxide adducts of fats and oils, alkylene oxide adducts of monostearylglyceride and alkylene oxide adducts of polyhydric alcohol partial or complete esters. The deinking compositions thus obtained also have excellent deinking performance. When the deinking composition according to the present invention contains the reaction mixture (III) and the above-mentioned effective components of the known deinking agents as the effective component, the weight ratio thereof may range from 90/10 to 10/90, preferably from 20/80 to 60/40. The deinking composition which contains the reaction mixture (III) alone as the effective component may be used together with other deinking compositions comprising other known deinking agent(s).

In general, a deinking composition is added in either one or both of the mixing step, which consists of the pulping, kneading, dispersing, chemical mixing and refining steps, and the flotation step. The deinking method according to the present invention may be effected in accordance therewith. It is preferable, in particular, that the above-mentioned deinking composition according to the present invention is added either all at once in the pulping step or in portions in the pulping step and any of the subsequent steps that may comprise the mixing step, since unliberated large ink spots can be reduced thereby.

The deinking composition according to the present invention may be added in portions in the pulping step and any of the subsequent steps that comprise the mixing step at a weight ratio of the pulping step to the subsequent step of from 10/90 to 90/10, preferably from 30/70 to 70/30.

It is desirable to use the deinking composition according to the present invention at such a ratio as to achieve an economic advantage without deteriorating the operating characteristics. It is recommended to add the deinking composition in sufficient amount such that the amount of the deinking agent as an effective component, that is, the amount of the reaction mixture (III), is to be from 0.03 to 1.0 % by weight based on the waste paper to be deinked.

The deinking method of the present invention is effective in deinking waste OA paper, magazines, telephone directories and leaflets which can hardly be deinked by known methods. Furthermore, it is also effective in deinking waste paper blends involving the above together with newspaper and common paper. The effects of the deinking method of the present invention is particularly obvious when applied to the deinking of waste paper blends involving about 5% by weight or more of waste OA paper, magazines, telephone directories and leaflets.

EXAMPLES

Example 1

Preparation of Deinking Agent

Beef tallow and glycerol were mixed together at each molar ratio specified in Table 1 and then subjected to transesterification at 135° C. under 30 Torr (0.04 atm). To each transesterification mixture (II) thus obtained were successively added EO and PO to effect an addition reaction at 120° to 160° C. under 3 to 6 atm. Thus each reaction mixture (III), wherein EO and PO added to the compounds having alcoholic hydroxyl groups in the transesterification mixture (II) and to those having alcoholic hydroxyl groups formed during the addition reaction in such a manner that the average molar number of EO addition per mole of the beef tallow and the average molar EO to PO ratio were each as specified in Table 1, was obtained. These products were used as deinking agents.

Deinking Method

In this Example, a deinking composition was added all at once in the pulping step.

A waste paper blend comprising collected waste newspaper and magazines (70/30%, by weight) were cut into pieces (2×5 cm). A given amount thereof was fed into a bench disintegrator. Then an appropriate amount of water, 1.0% by weight (based on the waste paper blend) of sodium hydroxide, 1.0% by weight (based on the waste paper blend) of sodium silicate No. 3, 1.5% by weight (based on the waste paper blend) of hydrogen peroxide aq. soln. (30% by weight) and 0.3% by weight (based on the waste paper blend) of each deinking composition consisting of each deinking agent listed in Table 1 were added thereto. After disintegrating at a pulp concentration of 5% by weight at 45° C. for 10 minutes, the mixture was aged at 55° C. for 120 minutes.

Next, the obtained pulp slurry was diluted with water so as to give a pulp concentration of 1% by weight and then subjected to flotation at 30° C. for 10 minutes. After the completion of the flotation, the pulp slurry was concentrated on an 80-mesh wire gauze so as to give a pulp concentration of 4% by weight and then diluted with water so as to give a pulp concentration of 1% by weight. Subsequently, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (100×magnification). Table 1 shows the results.

TABLE 1

| Deinking agent no. | Beef tallow/ glycerol (by mole) | Mol. no. of EO addn.*1 | EO/PO by mole*2 | Whiteness (%) | No. of unliberated ink spots (≦30 μm) | Lot |
|---|---|---|---|---|---|---|
| 1 | 0.8 | 24 | 1.0 | 64.3 | 2 | comp. |
| 2 | | | 2.0 | 59.9 | 10 | comp. |
| 3 | | 68 | 1.0 | 64.8 | 0 | invent. |
| 4 | | 81 | 0.1 | 58.6 | 15 | comp. |
| 5 | | | 1.0 | 65.3 | 0 | invent. |
| 6 | | | 2.0 | 57.2 | 20 | comp. |
| 7 | | 164 | 0.1 | 58.3 | 15 | comp. |
| 8 | 0.15 | 24 | 0.1 | 59.3 | 12 | comp. |
| 9 | | 68 | 0.1 | 60.2 | 10 | comp. |
| 10 | | | 1.0 | 67.8 | 0 | invent. |
| 11 | | 81 | 1.0 | 68.2 | 0 | invent. |
| 12 | | | 2.0 | 61.2 | 7 | comp. |
| 13 | | 164 | 2.0 | 60.9 | 8 | comp. |
| 14 | 0.05 | 24 | 0.5 | 63.7 | 5 | comp. |
| 15 | | | 1.5 | 64.2 | 2 | comp. |
| 16 | | 68 | 1.0 | 65.1 | 0 | invent. |
| 17 | | 81 | 0.5 | 64.9 | 1 | comp. |
| 18 | | | 1.0 | 65.5 | 0 | invent. |
| 19 | | 164 | 1.0 | 64.8 | 1 | comp. |
| 20 | | | 1.5 | 63.9 | 4 | comp. |

*1 on average
*2 the entire EO/the entire PO

Example 2

Preparation of Deinking Agent

The same deinking agents as those used in the above Example 1 were used.

Deinking Method

In this Example, a deinking composition was added all at once in the pulping step.

Collected waste ledger/PPC papers (70/30%, by weight) were cut into pieces (2×5 cm). A given amount thereof was fed into a bench disintegrator. Then an appropriate amount of water, 1.0% by weight (based on the collected waste ledger/PPC papers) of sodium hydroxide, 1.0% by weight (based on the collected waste ledger/PPC papers) of sodium silicate No. 3, 1.5% by weight (based on the collected waste ledger/PPC papers) of hydrogen peroxide aq. soln. (30% by weight) and 0.3% by weight (based on the collected waste ledger/PPC papers) of each deinking composition consisting of each deinking agent listed in Table 1 were added thereto. After disintegrating at a pulp concentration of 15% by weight at 45° C. for 20 minutes, the mixture was aged at 55° C. for 120 minutes.

Then the obtained pulp slurry was dehydrated on a high-speed dehydrator until the pulp concentration reached 22% by weight and then dispersed on a laboratory disperser at 300 rpm. Then it was diluted with water so as to give a pulp concentration of 4% by weight and disintegrated again on the bench disintegrator for 30 seconds.

After diluting with water so as to give a pulp concentration of 1% by weight, the pulp slurry was subjected to flotation at 30° C. for 10 minutes. The pulp slurry was then concentrated on an 80-mesh wire gauze so as to give a pulp concentration of 4% by weight and then diluted with water so as to give a pulp concentration of 1% by weight. Subsequently, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (100×magnification). Table 2 shows the results.

TABLE 2

| Deinking agent no. | Beef tallow/ glycerol (by mole) | Mol. no. of EO addn.*1 | EO/PO by mole*2 | Whiteness (%) | No. of unliberated ink spots (≦30 μm) | Lot |
|---|---|---|---|---|---|---|
| 1 | 0.8 | 24 | 1.0 | 88.2 | 2 | comp. |
| 2 | | | 2.0 | 85.1 | 28 | comp. |
| 3 | | 68 | 1.0 | 88.7 | 10 | invent. |
| 4 | | 81 | 0.1 | 84.8 | 30 | comp. |
| 5 | | | 1.0 | 89.0 | 9 | invent. |
| 6 | | | 2.0 | 85.1 | 26 | comp. |
| 7 | | 164 | 0.1 | 85.4 | 26 | comp. |
| 8 | 0.15 | 24 | 0.1 | 84.7 | 31 | comp. |
| 9 | | 68 | 0.1 | 85.4 | 27 | comp. |
| 10 | | | 1.0 | 90.2 | 5 | invent. |
| 11 | | 81 | 1.0 | 90.1 | 6 | invent. |
| 12 | | | 2.0 | 85.7 | 25 | comp. |
| 13 | | 164 | 2.0 | 85.3 | 30 | comp. |
| 14 | 0.05 | 24 | 0.5 | 87.9 | 12 | comp. |
| 15 | | | 1.5 | 88.3 | 11 | comp. |
| 16 | | 68 | 1.0 | 89.0 | 10 | invent. |
| 17 | | 81 | 0.5 | 88.6 | 11 | comp. |
| 18 | | | 1.0 | 89.2 | 10 | invent. |
| 19 | | 164 | 1.0 | 88.3 | 10 | comp. |

TABLE 2-continued

| Deinking agent no. | Beef tallow/ glycerol (by mole) | Mol. no. of EO addn.[1] | EO/PO by mole[2] | Whiteness (%) | No. of unliberated ink spots (≤30 μm) | Lot |
|---|---|---|---|---|---|---|
| 20 | | | 1.5 | 88.5 | 11 | comp. |

[1] on average
[2] the entire EO/the entire PO

Example 3

Preparation of Deinking Agent

Each fat or oil and each alcohol listed in Table 3 were mixed together at a molar ratio specified therein and subjected to transesterification at 135° C. under 30 Torr (0.04 atm). To each transesterification mixture (II) thus obtained were successively added EO and PO to effect an addition reaction at 120° to 160° C. under 3 to 6 atm. Thus each reaction mixture (III), wherein EO and PO added to the compounds having alcoholic hydroxyl groups in the transesterification mixture (II) and to those having alcoholic hydroxyl groups formed during the addition reaction in such a manner that the molar number of EO addition per mole of the fat and oil and the molar EO to PO ratio were each as specified in Table 3, was obtained. These products were used as deinking agents.

Deinking Method

In this Example, a deinking composition was added all at once in the pulping step.

Waste PPC paper (100%), printed by using 2.4 g/m² of a printing ink comprising a styrene/acrylic binder, were cut into pieces (2×5 cm). A given amount thereof was fed into a bench disintegrator. Then an appropriate amount of water, 0.5% by weight (based on the waste PPC paper) of sodium hydroxide, 1.0% by weight (based on the waste PPC paper) of sodium silicate No. 3, 1.0% by weight (based on the waste PPC paper) of hydrogen peroxide aq. soln. (30% by weight) and 0.2% by weight (based on the waste PPC paper) of each deinking composition consisting of each deinking agent listed in Table 3, which were either prepared for this Example or were conventional deinking agents, were added thereto. After disintegrating at a pulp concentration of 5% by weight at 45° C. for 20 minutes, the mixture was aged at 45° C. for 60 minutes.

Next, the disintegrated mixture was dehydrated on a high-speed dehydrator until the pulp concentration reached 22% by weight and then kneaded on a twin-screw laboratory kneader at 200 rpm. After diluting with water so as to give a pulp concentration of 4% by weight, it was disintegrated again on the bench disintegrator for 30 seconds. The obtained slurry was concentrated on an 80-mesh wire gauze until the pulp concentration reached 20% by weight and then diluted with water so as to give a pulp concentration of 1% by weight. Subsequently it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (100×magnification).

Table 3 shows the results.

Example 4

Preparation of Deinking Agent

The same deinking agents as those used in the above Example 3 were employed.

Deinking Method

In this Example, a deinking composition was added in portions in the pulping step and in the kneading step.

The same waste PPC paper as those used in the Example 3 were cut into pieces (2×5 cm). A given amount thereof was fed into a bench disintegrator. Then an appropriate amount of water, 0.3% by weight (based on the waste PPC paper) of sodium hydroxide and 0.1% by weight (based on the waste PPC paper) of each deinking composition consisting of each deinking agent listed in Table 3 were added thereto. After disintegrating at a pulp concentration of 5% by weight at 45° C. for 20 minutes, the mixture was aged at 45° C. for 60 minutes.

Next, the mixture was dehydrated on a high-speed dehydrator until the pulp concentration reached 22% by weight. Then 0.2% by weight (based on the waste PPC paper) of sodium hydroxide, 1.0% by weight (based on the waste PPC paper) of sodium silicate No. 3, 1.0% by weight (based on the waste PPC paper) of hydrogen peroxide aq. soln. (30% by weight) and 0.1% by weight (based on the waste PPC paper) of each deinking composition (the one used in the above disintegration) were added thereto and the obtained mixture was kneaded on a twin-screw laboratory kneader at 200 rpm. After diluting with water so as to give a pulp concentration of 4% by weight, it was disintegrated again on the bench disintegrator for 30 seconds. The obtained slurry was diluted with water so as to give a pulp concentration of 1% by weight and then subjected to flotation at 30° C. for 10 minutes. Subsequently it was concentrated on an 80-mesh wire gauze so as to give a pulp concentration of 4% by weight and then diluted with water so as to give a pulp concentration of 1% by weight. Subsequently, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (100×magnification).

Table 3 shows the results.

Example 5

Preparation of Deinking Agent

The same deinking agents as those used in the above Example 3 were employed.

Deinking Method

In this Example, a deinking composition was added all at once in the pulping step.

Telephone directories (yellow pages/white pages: 50/50%, by weight) were cut into pieces (2×5 cm). A given amount thereof was fed into a bench disintegrator. Then an appropriate amount of water, 1.0% by weight (based on the telephone directories) of sodium hydroxide, 1.0% by weight (based on the telephone directories) of sodium silicate No. 3, 1.5% by weight (based on the telephone directories) of hydrogen peroxide aq. soln. (30% by weight) and 0.2% by weight (based on the telephone directories) of each deinking composition consisting of each deinking agent listed in Table 3 were added thereto. After disintegrating at a pulp concentration of 5% by weight at 45° C. for 10 minutes, the mixture was aged at 55° C. for 120 minutes.

After the completion of the aging, a portion of the pulp slurry was treated in the following manner to determine the amount of undisintegrated matter.

Water was added to the slurry so as to give a pulp concentration of 0.025% by weight and the slurry was placed on a 16-mesh wire gauze and washed with 24 l of water in total. After washing, the undisintegrated matter remaining on the wire gauze was weighed and the ratio thereof was determined.

The residual pulp slurry, one after the completion of the aging, was used in the formation of a pulp sheet.

The pulp slurry was diluted with water so as to give a pulp concentration of 1% by weight and then subjected to flotation at 30° C. for 10 minutes. The pulp slurry was then concentrated on an 80-mesh wire gauze so as to give a pulp concentration of 4% by weight and then diluted with water so as to give a pulp concentration of 1% by weight. Subsequently, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (100×magnification).

Table 3 shows the results.

based on the waste paper to be deinked, of a reaction product mixture (III) obtained by conducting the addition reaction of ethylene oxide and propylene oxide with a mixture (I) comprising a fat and/or oil (a) and a mono- to hexahydric alcohol (b) or with a transesterification mixture (II) obtained by conducting the transesterification reaction of a fat and/or oil (a) with a mono- to hexahydric alcohol (b), or with both, in such a manner that the molar ratio of ethylene oxide to propylene oxide which are used as starting materials in said addition reaction range from 0.8 to 1.2 and that the molar number of ethylene oxide which is used for the addition reaction ranges from 50 to 100 mol per mole of the fat and/or oil (a).

2. The method for deinking waste paper as claimed in claim 1, wherein said mixture (I) or said transesterification mixture (II) or both is prepared by using a fat and/or oil (a) and a mono- to hexahydric alcohol (b) at a molar ratio of (b) to (a) of from 0.05 to 1.

3. The method for deinking waste paper as claimed in claim 2, wherein said mixture (I) or said transesterification mixture (II) or both is prepared by using a fat and/or oil (a) and a mono- to hexahydric alcohol (b) at a molar ratio of (b) to (a) of from 0.1 to 0.5.

4. The method for deinking waste paper as claimed in claim 1, wherein said mono- to hexahydric alcohol (b) is glycerol.

TABLE 3

| | | Deinking agent | | | | Quality of deinked pulp Example 3 | |
|---|---|---|---|---|---|---|---|
| Lot | No. | Fat and Oil (a) | Alcohol (b) | (a)/(b) (by mole) | Mol. no. of EO addn.*1 | EO/PO by mole*2 | Whiteness (%) | No of. unliberated ink spots (≧30 μm) |
| Invention products | 21 | beef tallow | ethylene glycol | 1/0.8 | 68 | 1.2 | 89.0 | 8 |
| | 22 | rapeseed oil | glycerol | 1/0.2 | 56 | 1.0 | 89.0 | 9 |
| | 23 | beef tallow | glycerol | 1/0.6 | 56 | 1.0 | 89.0 | 8 |
| Comparative products | 24 | beef tallow | stachyose | 1/0.05 | 56 | 1.0 | 88.1 | 15 |
| | 25 | linseed oil | glycerol | 1/0.4 | 33 | 0.3 | 87.0 | 26 |
| | 26 | polyoxyethylene (15 mol) polyoxypropylene (9 mol) lauryl ether | | | | | 86.0 | 44 |

| | | | Quality of deinked pulp | | | |
|---|---|---|---|---|---|---|
| | | | Example 4 | | Example 5 | |
| Lot | | No. | Whiteness (%) | No. of unliberated ink spots (≧30 μm) | Whiteness (%) | No. of unliberated ink spots (≧30 μm) | Remaining undisintegrated matters (%) |
| Invention products | | 21 | 90.3 | 7 | 62.1 | 19 | 0.04 |
| | | 22 | 89.9 | 7 | 62.2 | 17 | 0.02 |
| | | 23 | 90.1 | 7 | 62.0 | 19 | 0.03 |
| Comparative products | | 24 | 89.5 | 9 | 61.7 | 26 | 0.06 |
| | | 25 | 86.4 | 25 | 58.9 | 46 | 0.29 |
| | | 26 | 85.9 | 43 | 57.2 | 54 | 0.56 |

*1 on average
*2 the entire EO/the entire PO

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A method for deinking waste paper which comprises treating a waste paper pulp containing waste OA paper, magazines, or telephone directories, or mixtures thereof with a deinking composition comprising a deinking effective amount of 0.03 to 1.0% by weight, 5. The method for deinking waste paper as claimed in claim 1, wherein the addition reaction of ethylene oxide and propylene oxide is conducted by random addition.

6. The method for deinking waste paper as claimed in claim 1, wherein said deinking agent is added all at once in a waste paper pulping step.

7. The method for deinking waste paper as claimed in claim 1, wherein said deinking agent is added in portions in a waste paper pulping step and in a subsequent treatment step.

8. The method for deinking waste paper as claimed in claim 1, wherein said fat and/or oil (a) is selected from the group consisting of coconut oil, palm oil, olive oil, soybean oil, rapeseed oil, linseed oil, castor oil, sunflower oil, lard, beef tallow, bone fat, sardine oil, herring oil, fats and oils obtained by the hardening or semihardening of any of the above fats and oils, fats and oils obtained by the refining of any of the above fats and oils, and mixtures thereof.

9. The method for deinking waste paper as claimed in claim 1, wherein said mono- to hexahydric alcohol (b) is selected from the group consisting of a 1-alkanol, a 2-alkanol, an unsaturated alcohol, a cyclic alcohol, each having 1 to 24 carbon atoms, an $\alpha, \omega$-glycol, a 1,2-diol, a symmetric $\alpha$-glycol, a cyclic 1,2-diol, each having 2 to 32 carbon atoms, a tri- to hexahydric alcohol having 3 to 24 carbon atoms, and mixtures thereof.

10. The method for deinking waste paper as claimed in claim 9, wherein said mono- to hexahydric alcohol (b) is selected from the group consisting of octanol, nonanol, decanol, undecanol, lauryl alcohol, myristyl alcohol, cetyl alcohol, stearyl alcohol, eicosanol, oleyl alcohol, elaidyl alcohol, linoleyl alcohol, methanol, ethanol, n-propyl alcohol, isopropyl alcohol, 2-ethylhexanol, 2-hexanol, cyclononanol, cyclodecanol, hexane-1,2-diol, octadecane-1,2-diol, eicosane-1,2-diol, ethylene glycol, propylene glycol, butanediol, hexanediol, cyclononane-1,2-diol, butanoyl-$\alpha$-glycol, hexanoyl-$\alpha$-glycol, glycerol, erythrose, erythrulose, erythritol, threose, pentaerythritol, diglycerol, arabinose, xylose, xylulose, deoxyribose, lyxose, ribulose, ribose, arabitol, ribitol, altrose, allose, galactose, gulose, mannose, glycitol, inositol, mannitol, sorbitol, tetraglycerol, and mixtures thereof.

11. The method for deinking waste paper as claimed in claim 1, wherein said deinking composition further comprises an additional deinking component selected from the group consisting of a higher alcohol sulfate, an alkylbenzenesulfonate, an alkylene oxide adduct of a higher alcohol, an alkylene oxide adduct of an alkylphenol, a fatty acid or salt thereof, an alkylene oxide adduct of a fatty acid, an alkylene oxide adduct of a fat and oil, an alkylene oxide adduct of monostearylglyceride, an alkylene oxide adduct of polyhydric alcohol partial or complete esters, and mixtures thereof.

12. The method for deinking waste paper as claimed in claim 11, wherein the weight ratio of reaction product mixture (III) to said additional deinking component ranges from 90/10 to 10/90.

13. A method for deinking waste paper containing waste OA paper, magazines, or telephone directories, or mixtures thereof, comprising:
    (I) pulping the waste paper,
    (II) subjecting the pulp to at least one treatment step selected from the group consisting of kneading, dispersing, chemical mixing and refining, and
    (III) subjecting the treated pulp to a floatation or washing step,
wherein a deinking composition comprising a deinking effective amount of 0.03 to 1.0% by weight, based on the waste paper to be deinked, of a reaction product mixture (III) obtained by conducting the addition reaction of ethylene oxide and propylene oxide with a mixture (I) comprising a fat and/or oil (a) and a mono- to hexahydric alcohol (b) or with a transesterification mixture (II) obtained by conducting the transesterification reaction of a fat and/or oil (a) with a mono- to hexahydric alcohol (b), or with both, in such a manner that the molar ratio of ethylene oxide to propylene oxide which are used as starting materials in said addition reaction ranges from 0.8 to 1.2 and that the molar number of ethylene oxide which is used for the addition reaction ranges from 50 to 100 mol per mole of the fat and/or oil (a) is added at any time during steps (I), (II), and (III).

14. The method for deinking waste paper as claimed in claim 13, wherein said deinking agent is added all at once in step (I).

15. The method for deinking waste paper as claimed in claim 13, wherein said deinking agent is added in portions in steps (I) and (II).

* * * * *